United States Patent [19]

McLaughlin

[11] Patent Number: 5,630,079
[45] Date of Patent: May 13, 1997

[54] DOCUMENT JOB KEY TO TAILOR MULTIFUNCTIONAL USER INTERFACES

[75] Inventor: Denise C. McLaughlin, Macedon, N.Y.

[73] Assignee: Xerox Corporation, Stamford, Conn.

[21] Appl. No.: 444,806

[22] Filed: May 18, 1995

Related U.S. Application Data

[63] Continuation of Ser. No. 202,606, Feb. 28, 1994, abandoned.
[51] Int. Cl.⁶ ................................................. G06F 15/00
[52] U.S. Cl. ...................... 395/335; 395/339; 395/333; 395/347; 395/761
[58] Field of Search ................................ 345/2, 146, 149, 345/902; 395/156, 157, 159, 200; 358/442

[56] References Cited

U.S. PATENT DOCUMENTS

| | | | |
|---|---|---|---|
| 4,110,794 | 8/1978 | Lester et al. | 345/2 |
| 4,947,345 | 8/1990 | Paradise et al. | 358/442 |
| 5,008,853 | 4/1991 | Bly et al. | 345/2 |
| 5,146,561 | 9/1992 | Carey et al. | 395/200 |

OTHER PUBLICATIONS

Mastering "Windows 3.1" special Edition by Robert Cowart 1993, SYBEX.

*Primary Examiner*—Mark R. Powell
*Assistant Examiner*—Matthew Luu
*Attorney, Agent, or Firm*—Ronald F. Chapuran

[57] ABSTRACT

A user interface mechanism called a document key for determining the selections needed to support a given combination of services without the user having to explicitly select a given service. By simply changing document source and document destination characteristics, the user can create new combinations of functionality. In particular by selecting a given source and displaying a set of attributes related to the given source, selecting a given destination and displaying a set of attributes related to the given destination, and identifying a desired subset of the set of attributes related to the given source and to the given destination, the user can automatically construct a screen dialog for implementing the subsets of attributes related to the given source and destination.

21 Claims, 11 Drawing Sheets

DOCUMENT JOB KEY TO TAILOR MULTIFUNCTIONAL USER INTERFACES

This application is a file wrapper continuation of application Ser. No. 08/202,606, filed Feb. 28 1994, by Denise C. McLaughlin, and entitled "DOCUMENT JOB KEY TO TAILOR MULTIFUNCTIONAL USER INTERFACES", which is now abandoned.

BACKGROUND OF THE INVENTION

The present invention relates to a user interface for simplifying the transmission of data from a given source to a given receiver, in particular, automatically providing relevant transmission attributes for selection after the operator designates a particular source of data and a particular destination.

As networks and systems become more integrated and more complex, the amount and speed of information flow between users creates a need for more versatile and more efficient control over the information flow process. Current systems for sending a document or set of documents to a remote station require the operator to know designated limitations beforehand or require the operator to scroll through or review various features and limitations related to the document being sent or related to the device or receiver requirements at the receiving station.

Protocols defining integrated system behavior for devices such as printers, scanners, workstations and facsimiles, are well known. These protocols define how the systems should integrate across networks. Operational transparency across networks and device platforms, provide users with an increasingly integrated and transparent system environment. In this environment the manipulation of information (such as documents) is transparent to users as a result of the various network protocols that define the manner in which devices manipulate information. An example of an integrated system is the ISDN telephone network that provides services such as fax mail boxes and voice mail boxes.

Several Xerox Corporation U.S. patents describe systems having a network, server and printer usually with shared remote user terminals such as U.S. Pat. Nos. 5,153,577; 5,072,412; and 4,947,345.

Different workstations can access print services in different ways. To print a document, desirably the user can simply "copy" or "move" the document, with a mouse click or other command, to a printer icon on the workstation desktop, and set the displayed printing options, as on Xerox Corporation workstations. From other workstations such as the IBM PC's, the user may need to select menu items or type in commands to obtain access. The workstation selectable print options can include the number of copies, selected pages to be printed, paper size, image orientation, a choice of printers, and phone numbers when sending to a facsimile device.

The recently announced Xerox Corporation developed "PaperWorks"™ product utilizes a special encoded fine pattern of special marks ("glyphs"), electronically recognized as such using PC computer software by the facsimile electronic image receiver. It was initially configured to operate on a conventional personal computer having a conventional internal fax card and a modem, electronic mail system or other network connection to telecommunications, and running "Windows"™ software. A "PaperWorks"™ fax form carries a coded identification region which, upon scanning, may be decoded by an appropriate processing system. This coded identification allows the system to determine which of several different pre-stored forms the received form is, and what its page layout is. From this, the system can also extract the necessary user-entered information from the form to facilitate processing. An important feature of the "PaperWorks"™ system is the use of data defining a control sheet image to provide information in accordance with which operations are performed on data defining a sequence of images [data defining images, not actual physical sheets of a medium]. For example, the control sheet image can include information indicating a destination to which the fax server then transmits data defining said sequence of images.

It is also known as disclosed in pending application Ser. No. 07/130,929, D/92365, assigned to the same assignee as the present invention, to utilize a user interface to automatically distribute information to a receiver on a network using devices (such as printers and facsimile machines) and communication channels (such as electronic mail) defined in a receiver profile.

There is an increasing user demand to finish jobs more quickly and accurately, and to do more sophisticated tasks in the same time that it previously took them to accomplish simpler tasks. Copying (transforming hardcopy to hardcopy) is one kind of service in a broader range of services where many document transformation choices will be available to users. User interface designs for new systems must address increased capability and still reduce complexity.

A difficulty with the aforementioned systems, however, is the inability of the interface to automatically trigger the correct interface dialogs in response to selected source and destination options. Accordingly it would be desirable to provide a user interface including a screen display that promotes user tailorability and system expansion based upon source and destination selections.

It is an object of the present invention, therefore, to provide a new and improved user interface with the capability to selectively tailor the screen dialog based upon document source and destination attributes. It is still another object of the present invention to provide a document key or job tool at a user interface to initiate selection of a document source such as paper or electronic and selection of a document destination such as hardcopy or electronic or local or remote for print, file, or send parameters. Still another object of the present invention is to provide a user oriented document key that is attached to documents as processed, the document key being provided on user interfaces on shared multifunctional devices as well as on individual workstations to assist job set ups across networks. Other advantages of the present invention will become apparent as the following description proceeds, and the features characterizing the invention will be pointed out with particularity in the claims annexed to and forming a part of this specification.

SUMMARY OF THE INVENTION

The present invention is a user interface mechanism called a document key for multifunctional user interface dialogs on devices such as fax machines, printers, copiers, and workstations communicating with remote devices. The document key determines the selections needed to support a given combination of services without the user having to explicitly select a given service. By simply changing document source and document destination characteristics, the user can create new combinations of functionality. In particular by selecting a given source and displaying a set of attributes related to the given source, selecting a given destination and displaying a set of attributes related to the given destination, and identifying a desired subset of the set of attributes related to the given source and to the given destination, the user can automatically construct a screen dialog for implementing the subsets of attributes related to the given source and destination.

BRIEF DESCRIPTION OF THE DRAWINGS

For a better understanding of the present invention, reference may be had to the accompanying drawings wherein the same reference numerals have been applied to like parts and wherein.

While the present invention will hereinafter be described in connection with a preferred embodiment thereof, it will be understood that it is not intended to limit the invention to that embodiment. On the contrary, it is intended to cover all alternatives, modifications, and equivalents, as may be included within the spirit and scope of the invention.

DESCRIPTION OF EMBODIMENT

In the description herein the term "hard copy" refers to a sheet of paper or other such conventional individual physical image substrate, and not to electronic images. The term "document" refers to either a single page or multiple pages that can be represented either as hard copy or in some intermediate electronically stored format for later rendering to a human understandable form such as hard copy or video display. A "job" refer to one or more documents or sets of documents being sent to or received by a particular addressee or designee. Additionally, the term "multimedia" is defined herein as documents that relay information using audio and/or video, where video includes documents in the form of text, graphics and/or images.

"Multimedia" can also encompass any information such as "electronic mail", "facsimile", "voice-mail" or any other media transferable through network having interconnected printers, scanners, facsimile devices or file servers. Multimedia can be encoded in a plurality of formats (i.e., glyphs, page description languages, ASCII, bar code, etc.) in order to optimize the quantity of data required for storage and transmission efficiency as well as the speed with which the media is rendered to users (e.g., electronic images displayed or printed). Plural mode or "multifunction" systems or "devices" combine printing, scanning, editing, facsimile and message receiver printing capability, where one such capability is defined as a "service". The term "printer" encompasses hard copy output from various input sources, including facsimile, scanners, keyboard entry, and electronic document images input.

The term "electronic mail" (email) also has various broad meanings, and can include multimedia transmission by either external telephone lines, and/or shared internal networks using optical fiber, twisted wire pairs, coaxial cable, wireless transmissions, or other networking media, or combinations thereof, of documents for electronic remote terminal displays and/or printer hardcopy printouts, to any of the numerous addresses designated by the sender.

Figure 1:
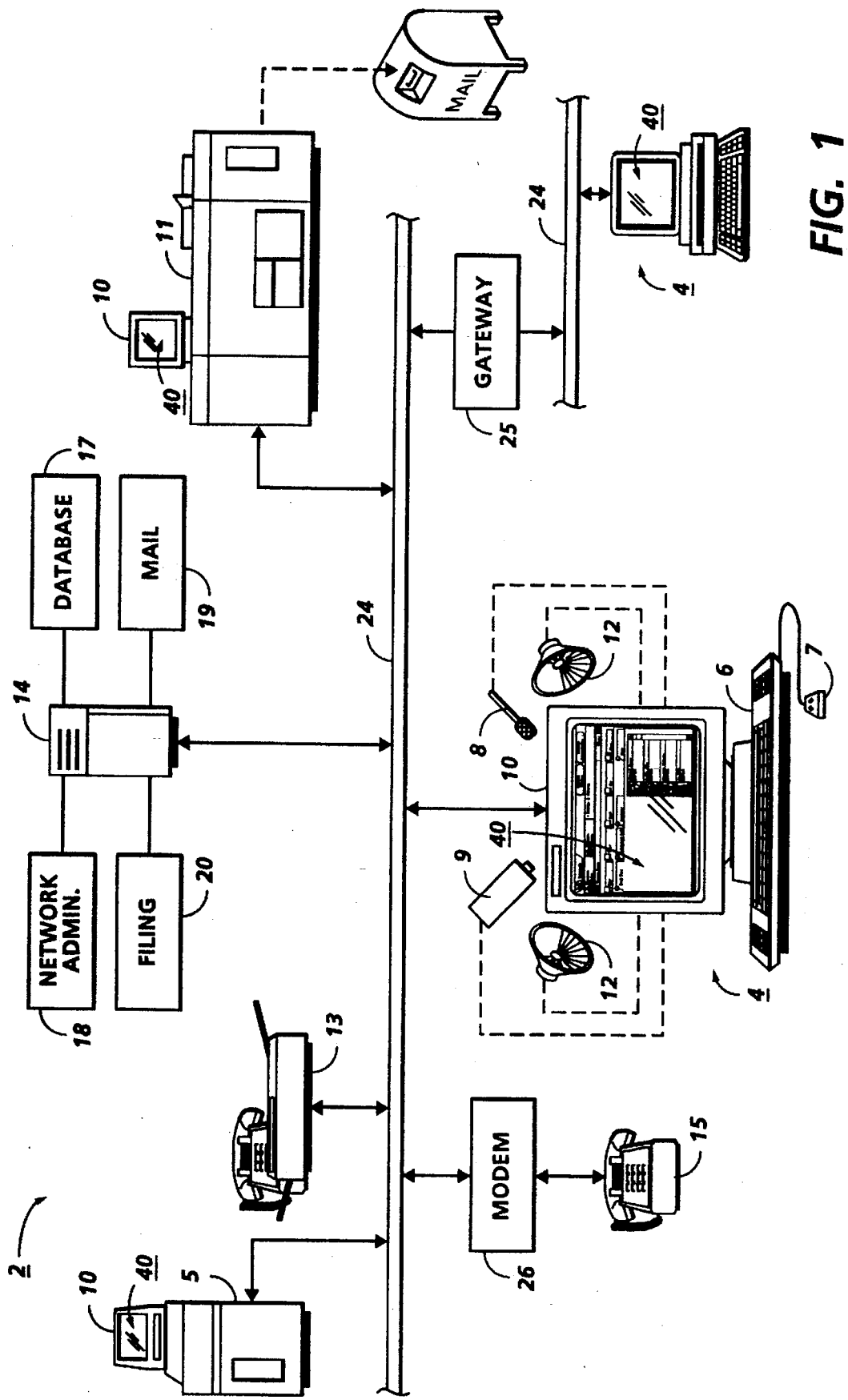
FIG. 1 is an illustration of a system environment incorporating the present invention.

Referring now to the drawings and in particular to FIG. 1, an exemplary multimedia device information system or network 2 including work station 4 enables users to communicate in a transparent and device independent manner. Multimedia system 2 can be implemented using a variety of hardware platforms and includes devices for input including scanner or digital copier 5, keyboard 6, pointing device or mouse 7, microphone 8, and video camera 9. The system further has devices for output including display terminal 10, printer 11, and speakers 12. Input/output (I/O) devices include facsimile 13, file server 14, and telephone 15. Server 14 is configured central to or remote from work station 4 with public, shared and/or private data storage that is differentiated by user access rights. The server 14 includes relational database system 17, network administration system 18, mail system 19 (e.g. email, voice mail) and data storage and retrieval system 20, and can be physically configured using optical drives, hard drives, floppy drives and/or tape drives. The relational database system 17 provides systems with fast query and retrieval of data.

Work station 4 operates in a collaborative environment, where users at different Work stations 4 can work together in real time to process and distribute public, shared or private information existing in different forms. (Public data is defined herein as data accessible by anyone, shared data is defined as data accessible by a limited number of users and private data is data uniquely accessible by a single user.) Work station 4 can exist in a distributed or centralized environment. In either environment Work station 4 is connected to other systems and devices through local area network (LAN) 24, gateway 25, and/or modem 26. In distributed systems, a number of Work stations extend distributed processing and storage capabilities to each other, by providing for example redundant storage or a single mounting of a unique application. Work station 4 includes an object oriented user interface (UI) 40 that uses icons and windows to represent various data objects and user applications such as a display illustrating an office desktop metaphor employing various abstractions of a typical office environment. User interfaces using windows and icons having an object oriented methodology to present metaphors for maintaining data, navigating through various user spaces and presenting abstract computer concepts are well known, an example of which is Globalview TM ("GV") software available from Xerox Corporation, which uses abstractions such as a desktop, inbasket, outbasket and documents.

Figure 2:
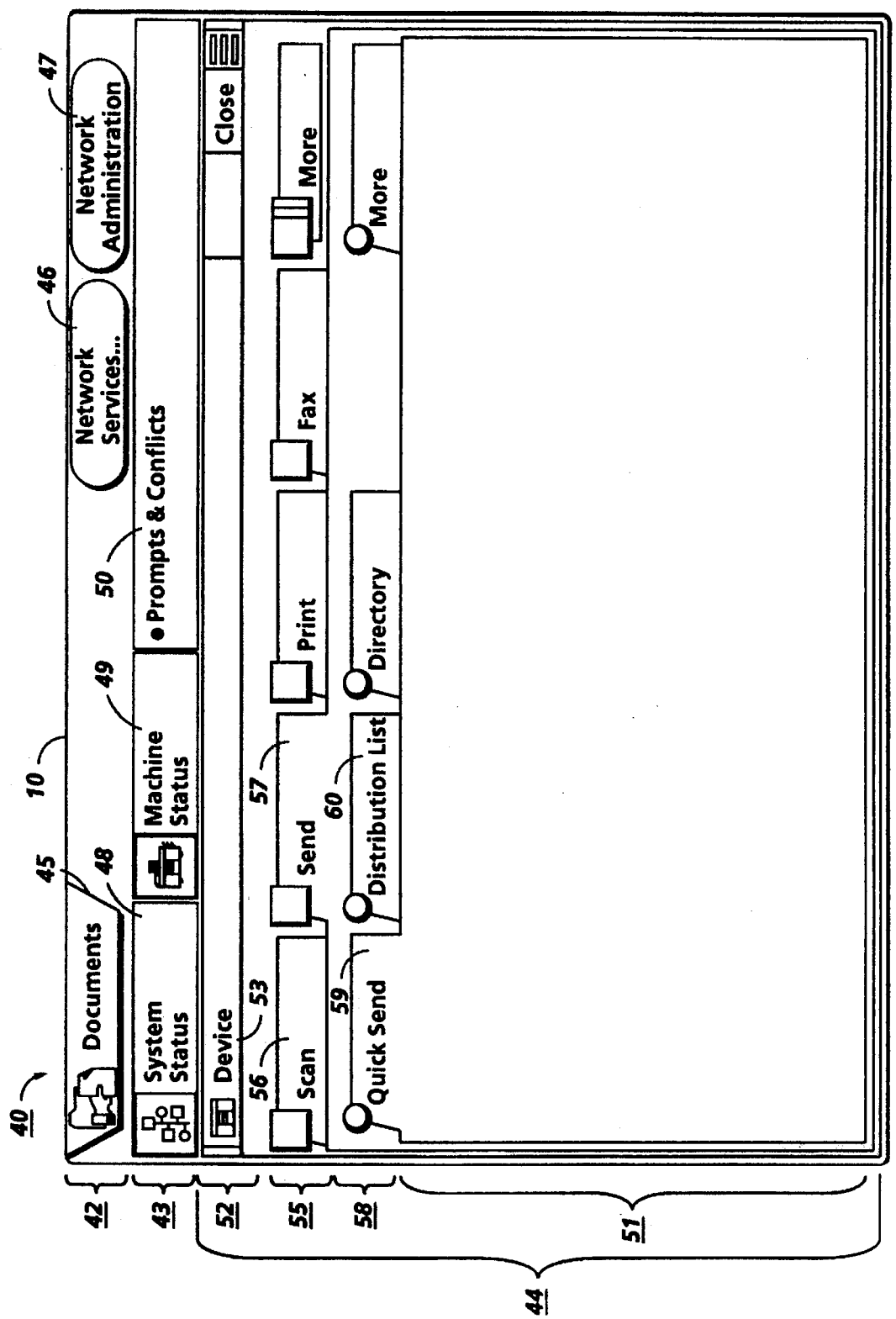
FIG. 2 is an enlarged view of a typical multi-device user interface for use on the display screens shown in FIG. 1.

FIG. 2 shows an embodiment of a multi-function device user interface 40 which is displayed on screens 10 of Work station 4, printer 11 and scanner 5. User interface (UI) 40 can operate remotely from any system; it is extensible across network services using remote windowing protocols such as X windows. For example, the user interface 40 on printer 11 is available remotely from any Work station 4 or alternate service such as scanner 5. Specifically, the user interface 40 is divided into three regions; resource bar 42, status bar 43, and service area 44. Resource bar 42 is a menu bar that provides users access to high level services that are integrated on network 24. Within the resource bar document source or suitcase 45 provides the user with a temporary storage space for documents. Suitcase 45 stores active and editable documents for easy movement across network services, or it is a transitional space where documents are stored while a user navigates through network 24.

Further, provided on resource bar 42 is network services menu 46 and network administration menu 47. Network services menu 46 provides access to any networked service such as printer 11, facsimile 13, scanner 5, file server 20 (private, shared and public file storage), database server 17, mail servers (e.g. voice mail, email, etc.) 19, ports (such as modem 26, network gateway 25), and other Work stations 4. Also, available in services area 44 are published communications channels 63 available from network admin 18. These are channels that have been provided to a utility (not shown) that manages network administration 18. These channels included in a user profile are provided by a user who is to receive data from other users on network 24. Other utilities available in network admin 18 are distribution lists, service access lists and other domain and area network services. Network administration 47 provides users with access to utilities for identification and location of profiles and services. For example, network administration 47 includes information concerning user access privileges as well as resource privileges to file server access.

Status bar 43 is divided into three dedicated message areas, system message area 48, device message area 49, programming conflicts message and prompt area 50. Text is updated in the message area 50 as system status changes. The message area 50 can be selected to reveal more detailed messages. For example, when a printer is down, the message area gives a "Printer Down" message; further selection of the message area 50 provides more detail of causes for the printer to be down. Service area 44 groups and holds related services and features as well as provides user work space 51. A selected device is identified on herald menu 52, that is, cording on menu 52 provides utilities available to the device name 53. For example, device 53 could be a network publishing system with scanning, printing or faxing facilities. Device 54 would be the physical network publisher exporting the services. Service bar 55 groups services available on service 53. For example, a user could select a service module to access a specific document service (e.g. scan 56 or send 57). Service sub bar 58 provides access to subservices within service modules. Workspace 51 provides a user area for preparing documents for distribution, which can include publication and archival.

In particular, the send service 57, which is a service displayed on service bar 55, is selected and opened on user interface 40 as shown in FIG. 2. As shown in FIG. 2, the send service 57 has sub service bar 58, with sub-services, quick-send 59 and distribution lists 60. The send service 57 provides virtual links or communication channels to other users on network 24.

Figure 3:
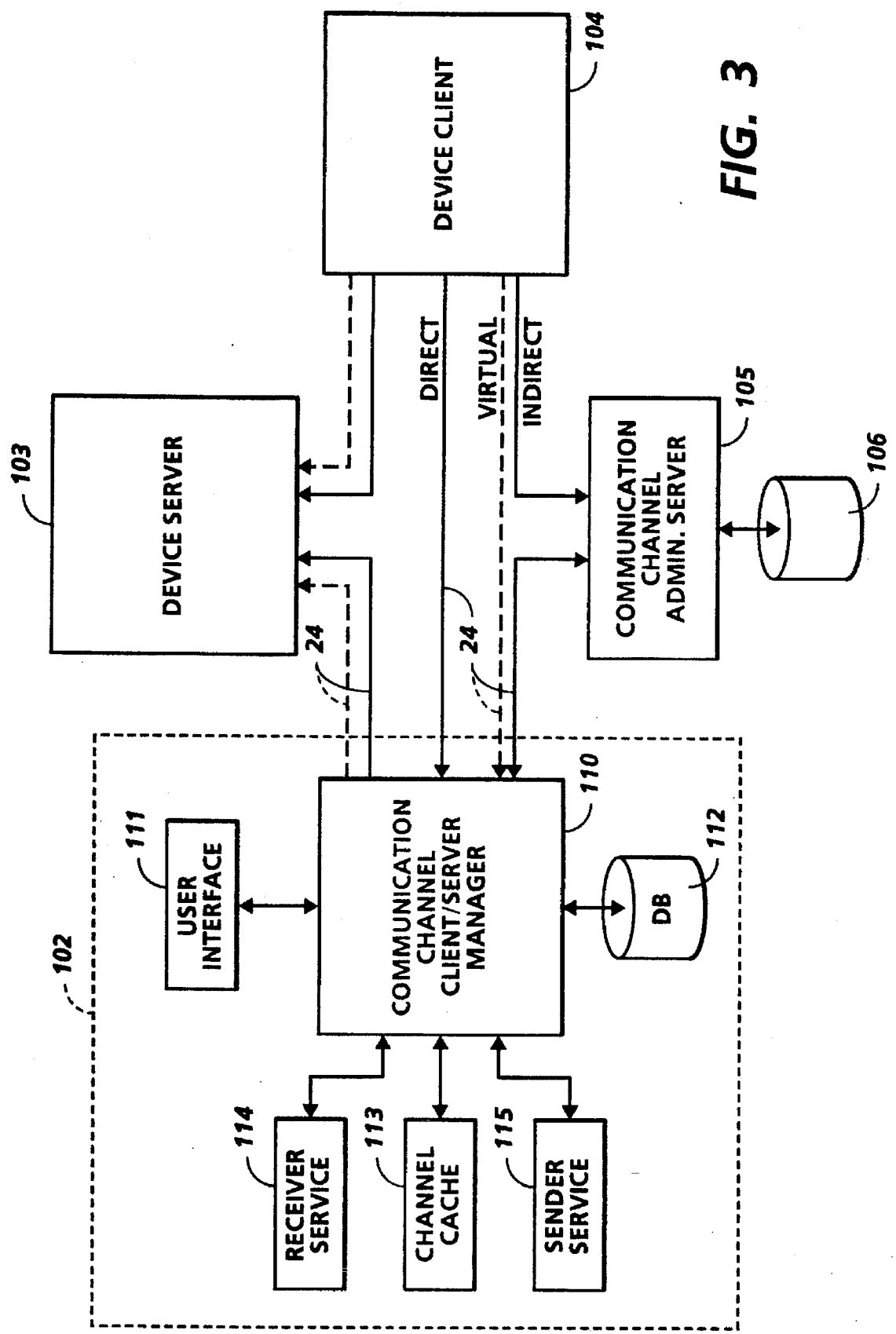
FIG. 3 shows a schematic view of a typical system architecture used in the system environment of FIG. 1.

The channel architecture is based on a client-server relationship, where client facilities are applications that are exported to the network 24, and server facilities are imported from the network. In other words, clients access exported server functionality. Thus, some services (printer, scanners, and the like) may only export or provide server functionality while using no client functionality. As a result, both the channel client and channel server may operate on the same service as well as uniquely on different services. The architecture is shown in detail in FIG. 3, where an integrated client/server system 102 is operating with stand-alone client 104, server 103 and communication channel admin server 105 that provides network administrative facilities such as storing communication channel information on disk 106.

Common to both the client and server architecture is communication channel manager 110. Manager 110 interfaces user interface 111 with network 24, local storage disk 112 and cache 113, receiver service 114 and sender service 115. Local storage available to manager 110 is in the form of long-term storage 112 (e.g. disk, floppy or tape) and short-term fast access, or cache storage, 113. Receiver service 114 provides server functionality while sender service 115 provides client functionality to manager 110. For further detail of an exemplary system, reference is made to pending application D/92365, Ser. No. 07/130,929, incorporated herein.

Multifunctional document systems must support a variety of new tasks in document distribution, storage, retrieval, communications, and printing. Using a Document Job Key concept in accordance with the present invention allows all job set ups to be done in a single way. It is a consistent method for setting up a job and accessing features, regardless of the combination of document services or devices required. Illustrated below is a sample Document Job Key on a UI dialog screen, showing an implied set of features to complete the job set up based on simple user instructions in the Document Job Key.

The Document Job Key asks users for "Source" (paper/ electronic) and "Destination" (hardcopy electronic/and local/remote/for print, file or send parameters). The Document Job Key settings automatically trigger the right combination of additional options, and the custom and system default settings for that kind of document transformation. For multifunctional and networked user interface systems, the Document Job Key filters out irrelevant features for presentation and provides users with only job appropriate features. Entries in the Key combine functionality immediately and without any additional instructions by the user, which avoids redundant job programming such as might occur if a user wants to copy a document, then file it, etc. by incorporating knowledge about the task upfront in the job set up.

The Document Job Key can be available as a user oriented job tool on UI's on shred multifunctional devices and also on individual workstations to assist users in job sets ups across networks. In this case the Key is "attached" to the document as it is sent for processing.

New multifunctional systems will be used by customers in a manner not anticipated. And end user tool allows the user to shape new applications by creating unique service combinations. It eliminates potential redundant user instructions and seamlessly accesses many underlying document services. Tailorability will be a key enabler to support users of new document systems with the ability to create their own custom document services. With added abilities, there is an increasing user demand to finish jobs more quickly and accurately, and to do more sophisticated tasks in the same time that it previously took to accomplish simpler tasks. Copying (transforming hardcopy to hardcopy) is one kind of service in a broader services area where many document transformation choices will be available to users.

User interface designs for new systems must address increased capability and still reduce complexity. The Document Key simplifies set up by asking users to focus only on documents and not on the selection of technology. For multifunctional types of services with a variety of devices (printers, copiers, workstations, fax hubs, etc.) which may be used to complete a given job, the Key creates a job set up which is as seamless and transparent as possible. Since it is not possible to anticipate all combinations of functionality users will need, the user interface concept of a Document Job Key offers an open ended design solution which can expand in functionality to meet changing work practices, and can support a unique user interface signature.

Figure 4:
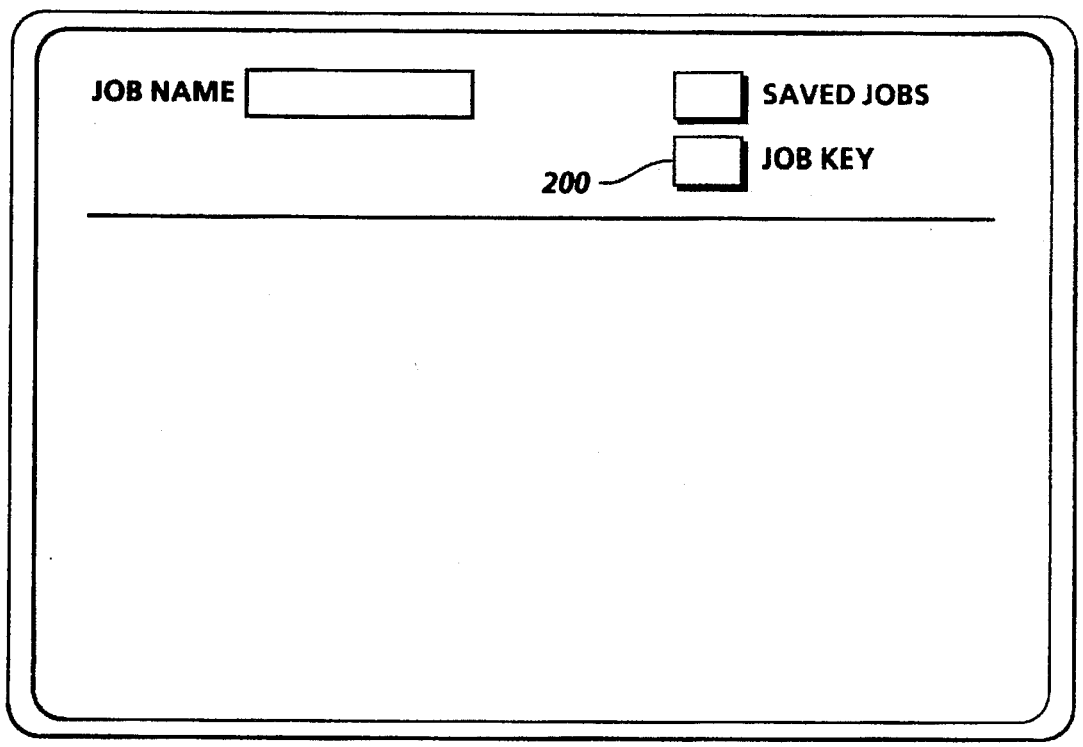
FIGS. 4 through 10 show simulated screen images of the document key in accordance with the present invention.
Figure 5:
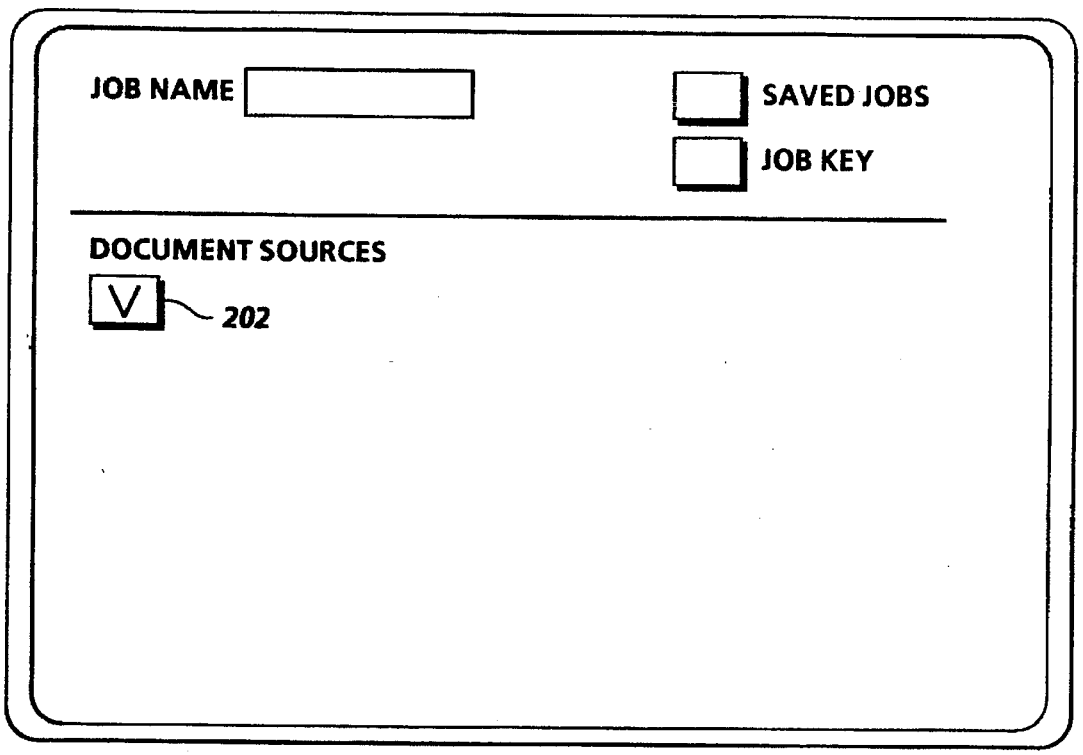
Figure 6:
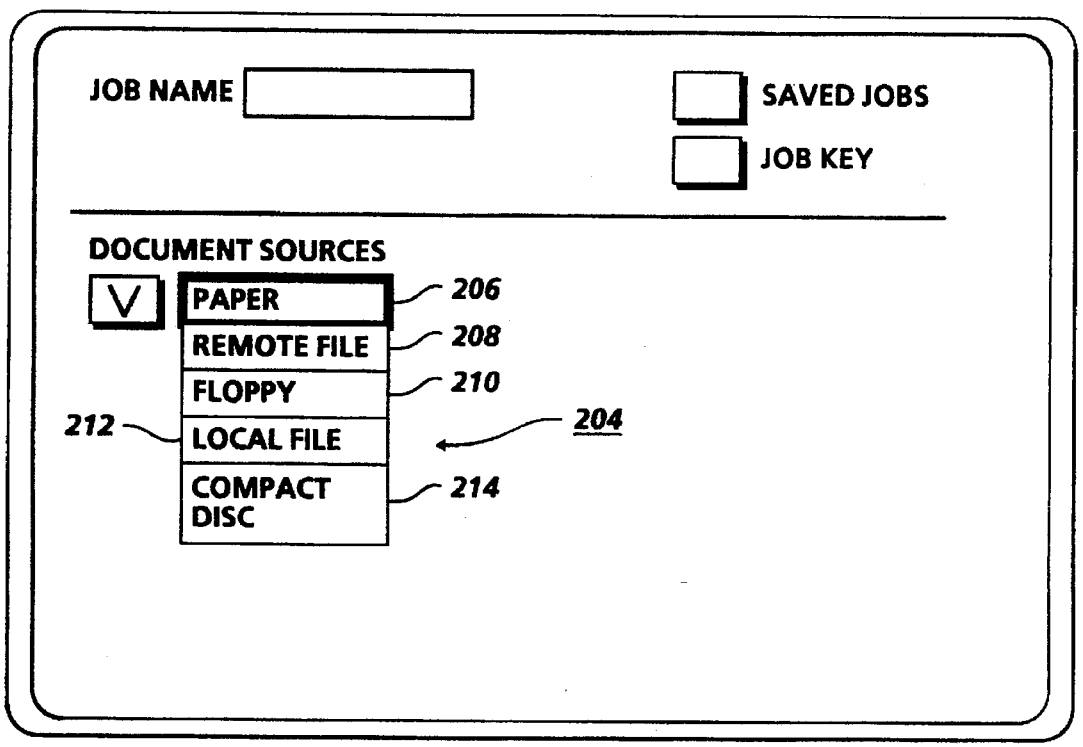

In accordance with the present invention, with reference to FIG. 4, there is disclosed a typical multifunctional device CRT based interface frame illustrating the initial options including a Job Key feature. Upon activation of the Job Key button 200, as shown, a subsequent screen frame FIG. 5 illustrates document sources option 202. Upon activation of the document sources button 202, various options are illustrated in pull down menu illustrated at 204 in FIG. 6, for example, paper 206, remote file 208, floppy disk 210, local file 212, and compact disk 214. By suitably highlighting one of the options in the pull down menu 204, such as illustrated with the paper 206 option the operator can select a particular document source option.

Figure 7:
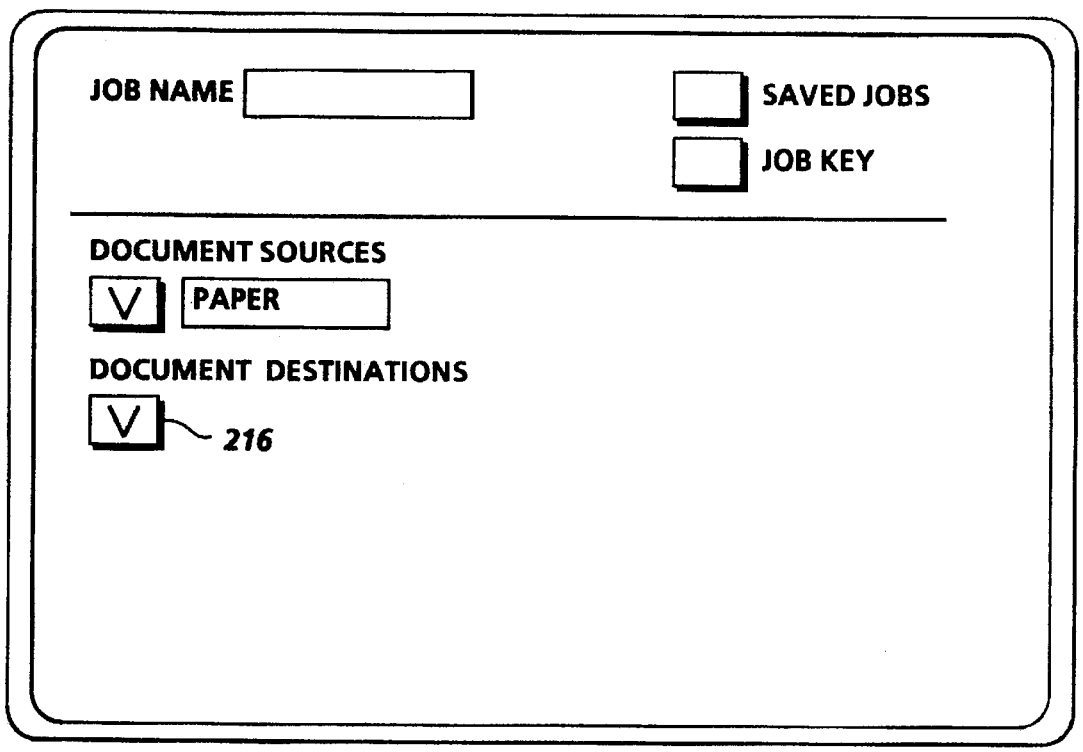
Figure 8:
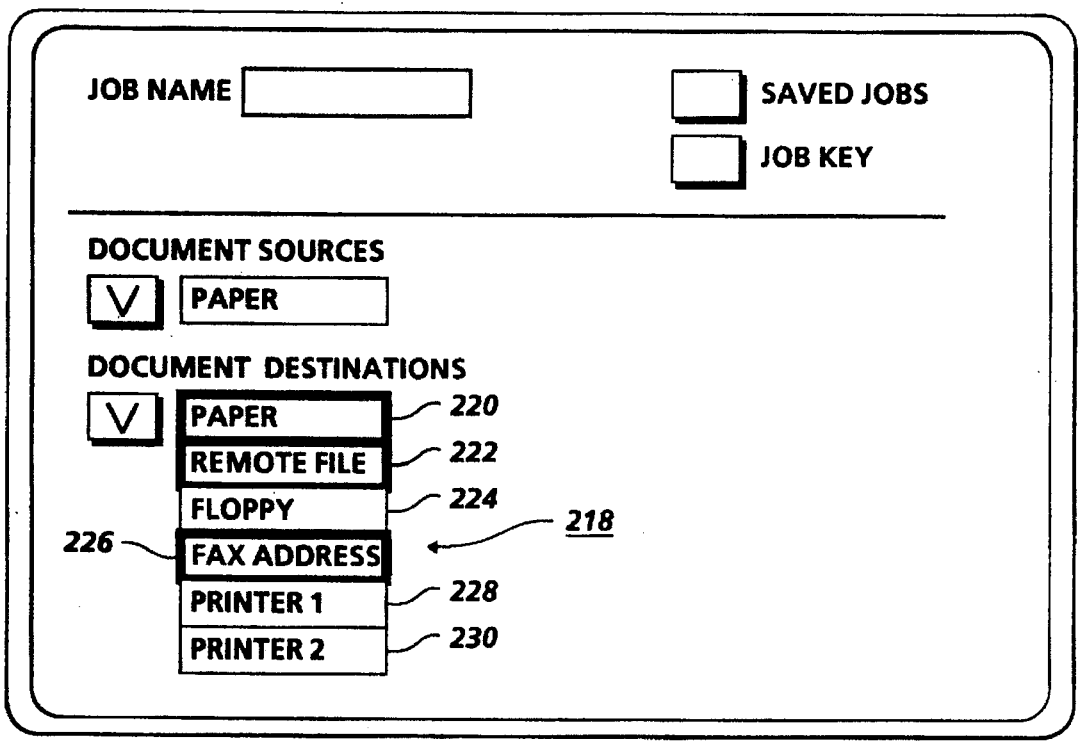

Upon selection of a document source, such as paper 206, the operator is then provided with a document destination button 216 as illustrated in FIG. 7. By activation of the document destination 216 option, a menu of destination options is provided as illustrated at 218 in FIG. 8. Similar to the selection of the documents source, the operator has various options for the document destination such as printer 220, remote file 222, floppy disk 224, fax address 226, and a choice of printers, Printer 228 and Printer 230. It should be noted that the operator can select more than one document destination. In particular, as shown in highlighted form, the operator has selected the designations to be paper 220, a remote file 222, and a fax address 226.

In other words the operator desires that a particular document source, a set of paper documents, is to be reproduced for three different destinations. The paper designation indicates the documents are to be reproduced as another set of documents at the particular document source location. It should also be understood that the particular document source set could be converted to electronic form and transmitted on a network to various other locations having printers or workstations. In the example given, the operator designates a remote file as well as a fax address. It should be understood that in transmitting to a remote file of necessity requires a conversion of the document source to an electronic format.

Figure 9:
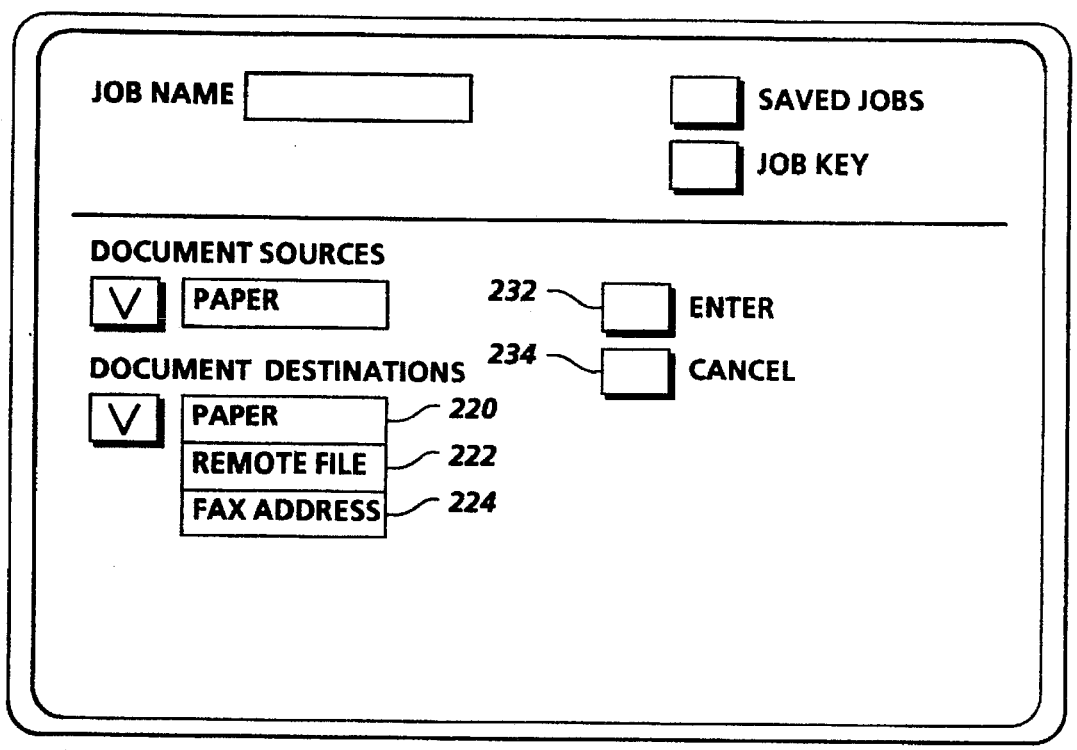
Figure 10:
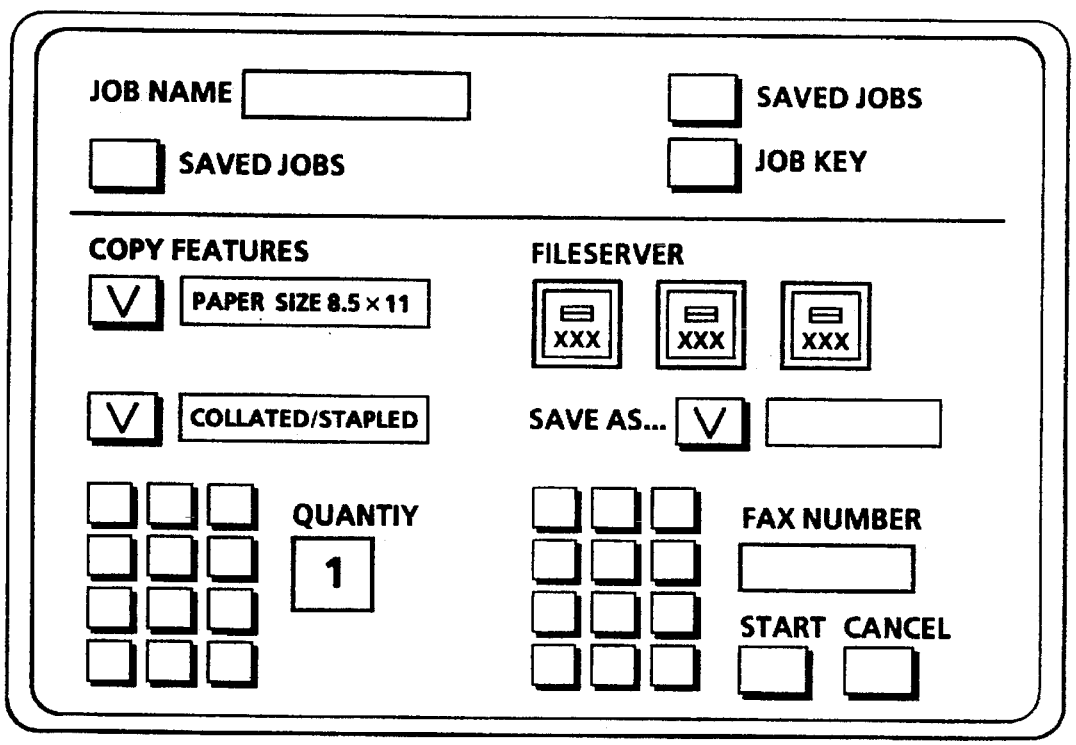

As shown in FIG. 9, the operator has selected three destinations, paper 220, remote file 222, and fax address 224. The operator also has the option to enter the selections at button 232 or to cancel the selections at button 234. Once, the document source and document destinations have been selected, as illustrated in FIG. 10, the appropriate options for selecting copy features are then presented on a suitable frame at the user interface. For example, the operator then is able to enter a fax number for a particular fax address for the documents to be sent, is able to select a number of copies as well as various other copy features such as paper size and collated and stapled.

Figure 11:
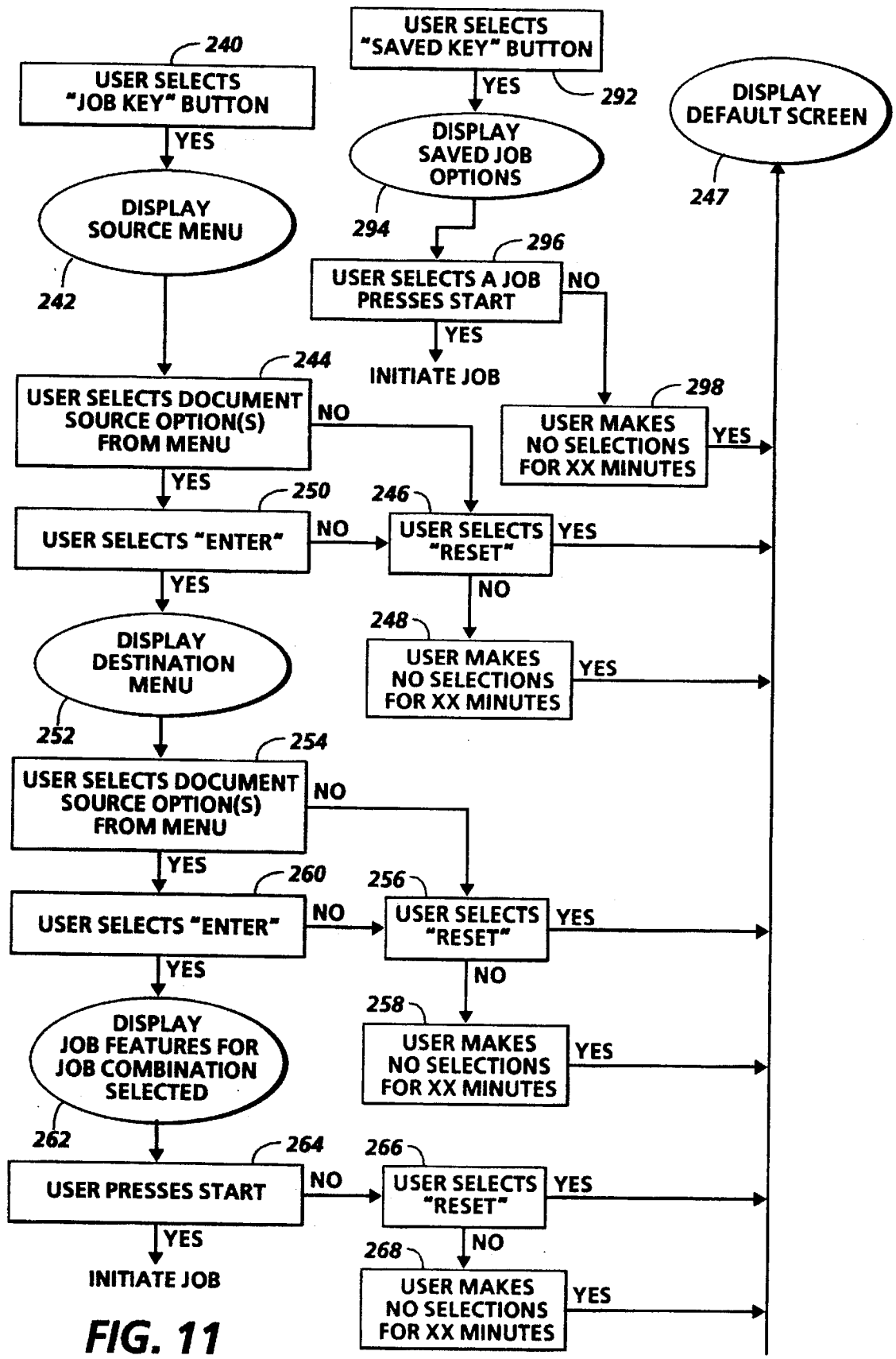
FIG. 11 is a flow chart illustrating the document key procedure in accordance with the present invention.

With reference to FIG. 11, there is a flow chart illustrating the procedure in accordance with the present invention. Upon selection of the job key button, as illustrated at block 240, there is a display of a document source menu as shown at block 242. The user then selects a document source from the options menu shown at 244 which is automatically entered or by activation of an enter button as illustrated at block 250. On the other hand if no document source is selected or the user selects an optional reset button as shown at 246, the display reverts to a Default screen as shown at block 247.

Once the user or operator has selected a document source, the display will then provide a menu of destination options as shown at 252. If the user opts to not select a document destination or in the alternative engages a reset button as shown at block 256, again the display will revert to a Default screen as indicated at block 247. Another alternative as illustrated at block 258 is to revert to the default screen if the user makes no selections either for a document source or a document destination within a given set period of time.

Once the user has entered the document destination options as shown at block 260, there is a display of job features to be selected for the particular combination of document source and document destination as shown at block 262. As shown in FIG. 10, the particular features to be selected that are displayed are only pertinent to the particular document source as well as the document destination, thus eliminating and avoiding any irrelevant or non pertinent features or options. Upon making the appropriate job feature selections, the user presses start as illustrated at block 264 and the job is initiated. On the other hand as illustrated at blocks 266 and 268, if the user selects a reset button or makes no selections within a given period of time, again the display will divert to a default screen.

Figure 12:
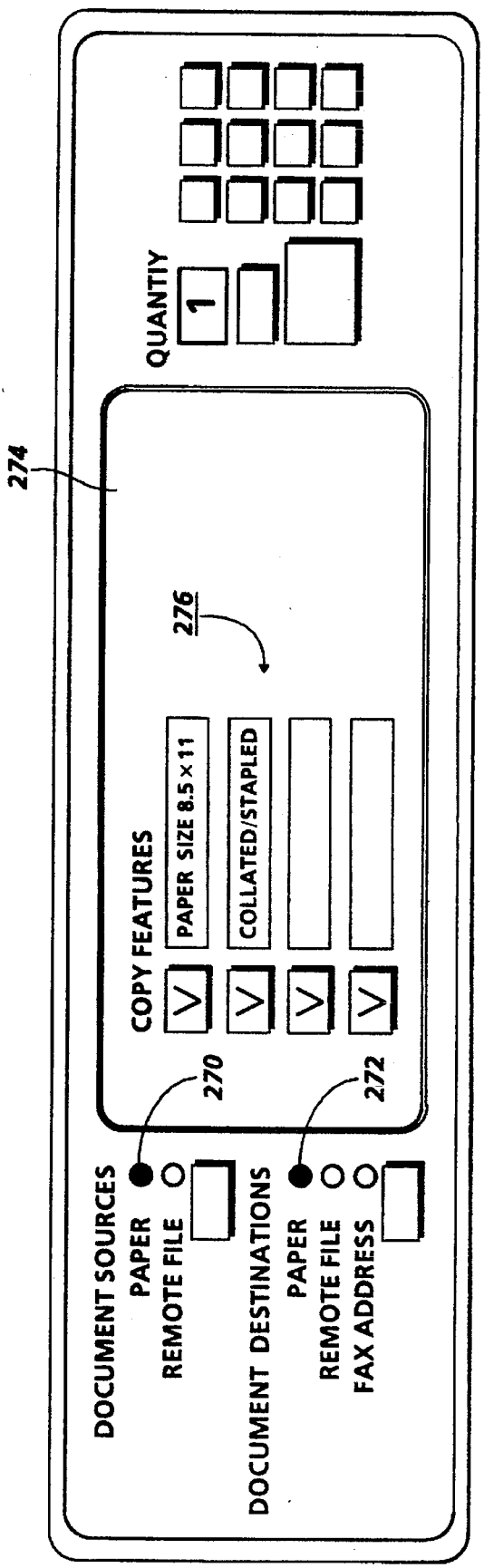
FIGS. 12, 13, and 14 illustrate simulated screen images of an alternative embodiment of the document key in accordance with the present invention.
Figure 13:
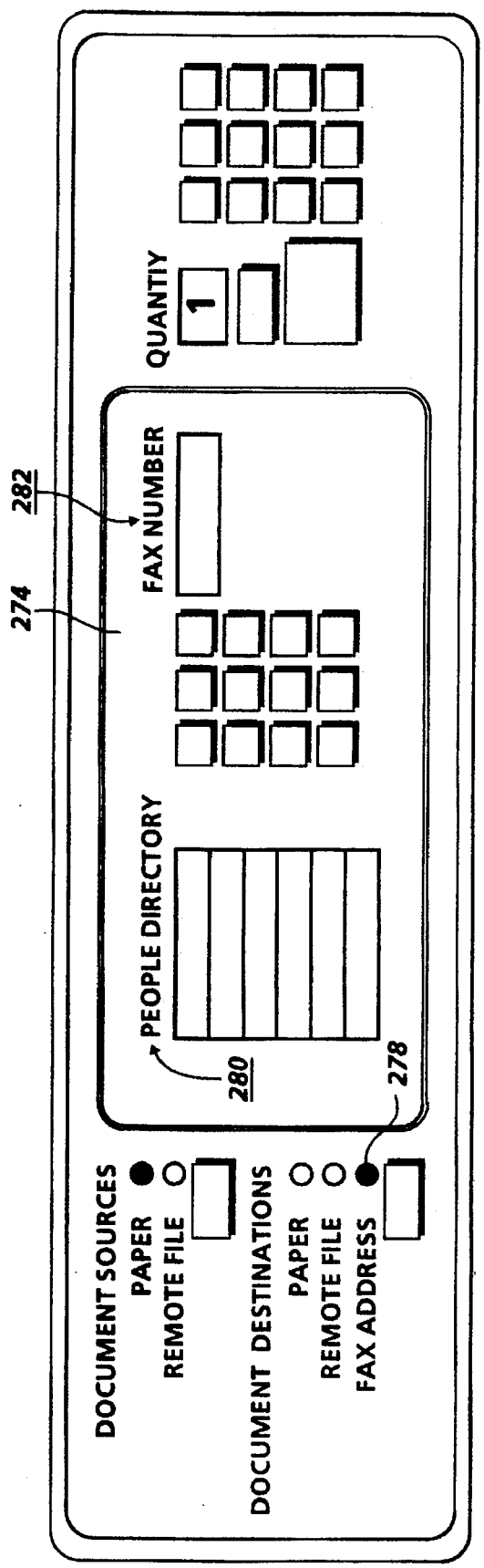
Figure 14:
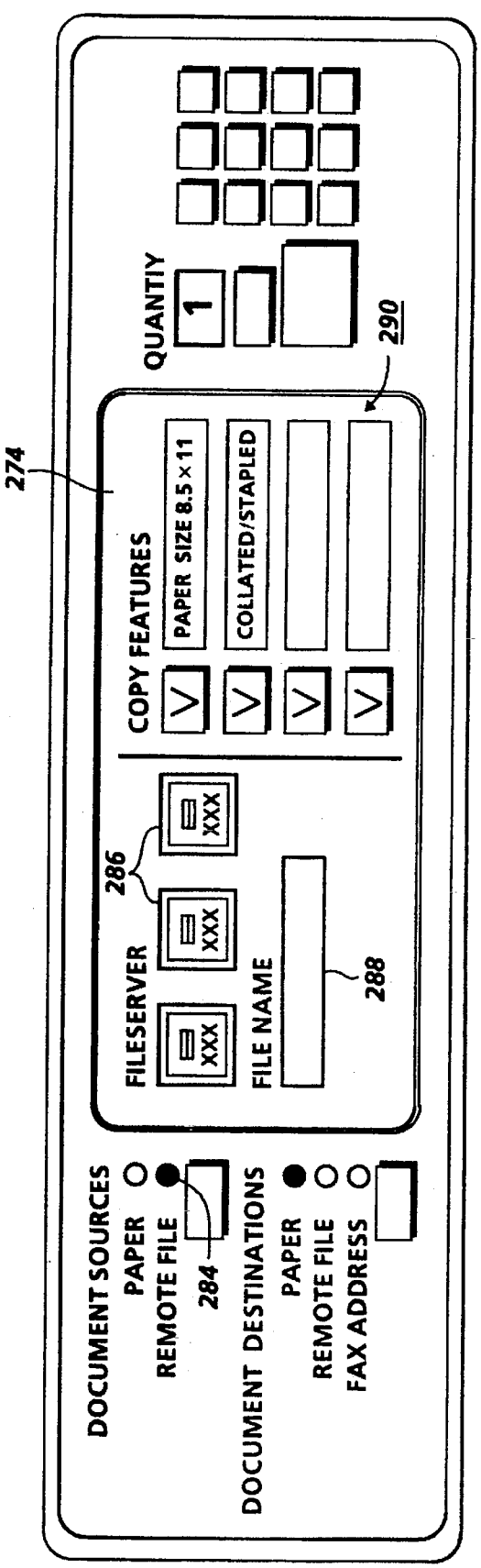

FIGS. 12, 13 and 14 show another user interface embodiment in particular a machine with a control panel interface with LCD display with limited options. For example FIG. 12 illustrates an interface hard panel with two choices for the document source and three choices for the document destination as well as copy features limited to the selection of the document source as paper. For example, the document source is shown as paper at 270 and the document destination is shown as paper at 272. With this combination there are displayed features generally shown at 276 related to the particular source and destination combination features such as paper size and collated-stapled.

FIG. 13 illustrates a document source as paper and a document destination as a fax as illustrated at 278. For this combination a different LCD display shows pertinent options such as a window at 282 to enter the appropriate fax number and a people directory shown at 280 for scrolling through a list of people or locations for appropriate fax numbers. FIG. 14 illustrates another document source document destination combination in particular a remote file document source as shown at 284 and a document destination as paper. For this combination, there are shown file server icons at 286 and a window at 288 to enter a file name for a particular file at a selected file server. Again since the destination in a paper mode, various copy features are again illustrated at 290 related to the paper document destination. Another feature of the present invention is to be able to save a particular Document Job Key in suitable memory locations. Saved Document Job Keys can then be retrieved from memory and immediately initiated. For example with reference to FIG. 11, block 292 illustrates the selection of a "Saved Key" button. Upon activation of the button, there is a display of saved key options, shown at 294. Block 296 demonstrates the selection of a Job Key and the initiation of the job after pressing start. If no selection is made after a given time period, shown at block 298 there is a return to the Default screen as illustrated at 247.

While the invention has been described with reference to the structure disclosed, it is not confined to the details set forth, but it is intended to cover such modifications or changes as may come within the scope of the following claims.

I claim:

1. A method of distributing a document on a user interface screen, the user interface having access to a plurality of electronic devices over a network, the plurality of electronic devices being represented by identifiers on the interface screen comprising the steps of:

selecting at the user interface identifiers representing a first combination of electronic devices from the plurality of electronic devices including a source device and a destination device, automatically responding to the selecting of the first combination of electronic devices to provide a first set of feature options for display on the interface screen, the first set of displayed feature options being dependent upon the first combination of electronic devices and avoiding non-pertinent feature options, selecting at the user interface identifiers representing a second combination of electronic devices from the plurality of electronic devices including a source device and a destination device, and automatically responding to the selecting of the second combination of electronic devices to provide a second set of feature options for display on the interface screen, the second set of feature options being dependent upon the second combination of electronic devices and avoiding non pertinent features, whereby the operator is presented with feature options associated with a particular combination of electronic devices.

2. The method of claim 1 wherein the plurality of electronic devices includes copier, printer, and workstation devices.

3. The method of claim 1 wherein the plurality of electronic devices includes facsimile devices.

4. In a user interface interconnected to predetermined devices, the user interface having a display screen providing access to a data transmission option providing a configured scheme for transmitting data to said predetermined devices, the user interface comprising:

a screen display adapted for displaying icons and menu options, predetermined icons identifying data files, a graphic pointer electrically connected to the screen display for selecting icons and menu options, means to identify a given data file on the screen display by the graphic pointer, means to specify a destination for said given data file, and means to automatically access said data transmission option upon specifying said destination for selecting transmission properties for automatically transmitting said given data file to a given device with said transmission properties wherein the data transmission option varies depending upon the identity of a given data file and the destination for said given data file.

5. The user interface of claim 4 wherein the data transmission option includes a specific menu of selections on the display screen for preselected data files and data destinations.

6. The user interface of claim 4 wherein the data transmission option includes a hierarchy of selections progressively provided at the user interface.

7. A user interface for facilitating the operation of transmitting data from a source to a destination comprising:

a screen display adapted for displaying icons and menu options, predetermined icons identifying data files, means to identify a data file on the screen display by selecting the data file icon, means to access a list of remote destinations by selecting a remote destination indicator, means to specify a remote destination from said list of remote destinations, means to automatically display a plurality of transmitting options on the screen, the transmitting options being a function of an identified data file and a specified remote destination, means to select transmitting options, and means to transmit said identified data file to said remote destination in accordance with the selected transmitting options.

8. A method of distribution of documents to selected devices interconnected on a network comprising the steps of:

entering a document distribution mode at an interface connected to the network, providing a plurality of source selections at the interface including a hard copy source, a remote electronic source, and a local electronic source, providing a plurality of destination selections at the interface including a network printer, a network facsimile machine, and a remote electronic file, selecting one of the plurality of source selections and one of the plurality of destination selections, and responsive to the selection of said one of the plurality of source selections and one of the plurality of destination selections, automatically presenting a predetermined set of feature options for distributing a document to the selected destination, the predetermined feature options being relevant to the selected source and destination, the predetermined feature options excluding features not pertinent to the selected source and destination.

9. The method of claim 8 including the step of presenting a second predetermined set of feature options in response to the selection of either a different source option or a different destination option.

10. A method of configuring a user interface in response to selected sources and destinations of documents to provide operator options exclusive to the selected source and destination for conveyance of documents from a source to a destination, the sources providing hard documents and electronic documents, the destination providing hard documents and electronic documents, the exclusive operator options being a function of both the selected source and destination, comprising the steps of:

displaying document source options and selecting a given document source, displaying document destination options and selecting a given document destination, automatically responding to the selection of said given document source and said given document destination, displaying feature options dependent upon both the given document source and given document destination, and selecting feature options and initiating the conveyance of documents from the selected source to the selected destination.

11. The method of claim 10 wherein the step of selecting a given document source includes the step of reverting to a default source.

12. The method of claim 10 wherein the step of selecting a given document destination includes the step of reverting to a default destination.

13. The method of claim 10 wherein document sources include remote electronic files.

14. The method of claim 10 wherein document sources include selected machine document trays.

15. The method of claim 10 wherein the step of selecting a given document source includes the step of selecting multiple document sources.

16. The method of claim 10 wherein document destinations include fax machines.

17. The method of claim 10 wherein the step of selecting a given document destination includes the step of selecting multiple document destinations.

18. A method of configuring a user interface in response to selected sources and destinations of documents to provide operator options related to the selected source and destination for conveyance of documents from a source to a destination, the operator options being a function of both the selected source and destination, comprising the steps of:

selecting a given document source, automatically displaying document destination options and selecting a given document destination, in response to the selection of said given document source and said given document destination, displaying feature options dependent upon both the given document source and given document destination, and selecting feature options and initiating the conveyance of documents from the selected source to the selected destination.

19. The method of claim 18 wherein the step of selecting a given document source includes the step of selecting multiple document sources.

20. The method of claim 18 wherein document destinations include printers.

21. The method of claim 18 wherein the step of selecting a given document destination includes the step of selecting multiple document destinations.

* * * * *